(12) United States Patent
Haldar et al.

(10) Patent No.: US 8,219,067 B1
(45) Date of Patent: Jul. 10, 2012

(54) DELAYED DISPLAY OF MESSAGE

(75) Inventors: Debashis Haldar, Olathe, KS (US); Piyush Upadhyay, Overland Park, KS (US); John Chandler Witzgall, Overland Park, KS (US); William James Routt, Leawood, KS (US); Badri Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 718 days.

(21) Appl. No.: 12/233,703

(22) Filed: Sep. 19, 2008

(51) Int. Cl.
*H04M 1/725* (2006.01)

(52) U.S. Cl. .................. 455/412.2; 455/466; 455/412.1; 455/414.1

(58) Field of Classification Search .................. 455/466, 455/412.1, 412.2, 414.1
See application file for complete search history.

(56) References Cited

U.S. PATENT DOCUMENTS

| 2004/0203890 | A1* | 10/2004 | Karaoguz et al. | 455/456.1 |
| 2005/0272409 | A1* | 12/2005 | Mizuno et al. | 455/413 |
| 2006/0085195 | A1* | 4/2006 | Nishizaki et al. | 704/260 |
| 2007/0298770 | A1* | 12/2007 | Lee et al. | 455/412.2 |
| 2008/0192820 | A1* | 8/2008 | Brooks et al. | 375/240.02 |
| 2009/0311992 | A1* | 12/2009 | Jagetiya | 455/412.1 |

* cited by examiner

*Primary Examiner* — Justin Lee

(57) ABSTRACT

A system, method, and computer-readable media are described for allowing a user to specify a desired time of delivery for a message (e.g., MMS message, SMS message). In one embodiment, a user interface is provided that allows the user to set a desired time of delivery while composing the message. The desired time of delivery is then included in the message. The recipient device places the message in a hidden folder until the desired time of delivery. Also, a messaging center may wait to deliver a messaging-waiting notification to the recipient until a low network usage period.

14 Claims, 4 Drawing Sheets

DELAYED DISPLAY OF MESSAGE

SUMMARY

The present invention is defined by the claims below. Embodiments of the present invention allow a user to specify the time at which a recipient receives a message (e.g., SMS message, MMS message). For example, on Dec. 27, 2008, a user may specify that a message is delivered to a recipient at 12:00 AM on Jan. 1, 2009. In one embodiment, the specified delivery time is added to a header in the outgoing message. Upon receiving the message, the receiving client may store the message in a hidden folder and move it into the recipient's inbox at the specified delivery time. A message-waiting notification may be provided to the recipient once the message is in the recipient's inbox. In one embodiment, messages with a specified delivery time are delivered before the specified time when the network bandwidth usage is low.

In a first illustrative embodiment, one or more computer-storage media having computer-executable instructions embodied thereon for performing a method of specifying a desired time of delivery for a message are provided. The method includes receiving a delivery address for the message and receiving the desired time of delivery for the message. The method further includes generating the message with the desired time of delivery included in a header of the message and transmitting the message.

In another illustrative embodiment, one or more computer-storage media having computer-executable instructions embodied thereon for performing a method of handling a message that specifies a desired time of delivery are provided. The method includes receiving a notification message indicating the message is available to download and retrieving the message that specifies the desired time of delivery. The method also includes storing the message in a hidden folder. The message is not accessible by a user when the message is in the hidden folder, and an indication communicating that the message has been received is not presented to the user when the message is in the hidden folder. The method further includes determining that the message specifies the desired time of delivery, wherein the desired time of delivery is when the message is to be made available to a recipient. The method further includes moving the message into an inbox when a present time equals the desired time of delivery. The message is accessible by the user when the message is in the inbox.

In a third illustrative embodiment, one or more computer-storage media having computer-executable instructions embodied thereon for performing a method of prioritizing transmission to a recipient of a notification indicating a message is available for download. The method includes receiving the message, wherein the message specifies a desired time of delivery and checking a notification policy to determine when to deliver the notification to a message recipient that indicates the message is available for download. The method also includes determining that the notification policy is satisfied and upon said determination, transmitting the notification to the recipient.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
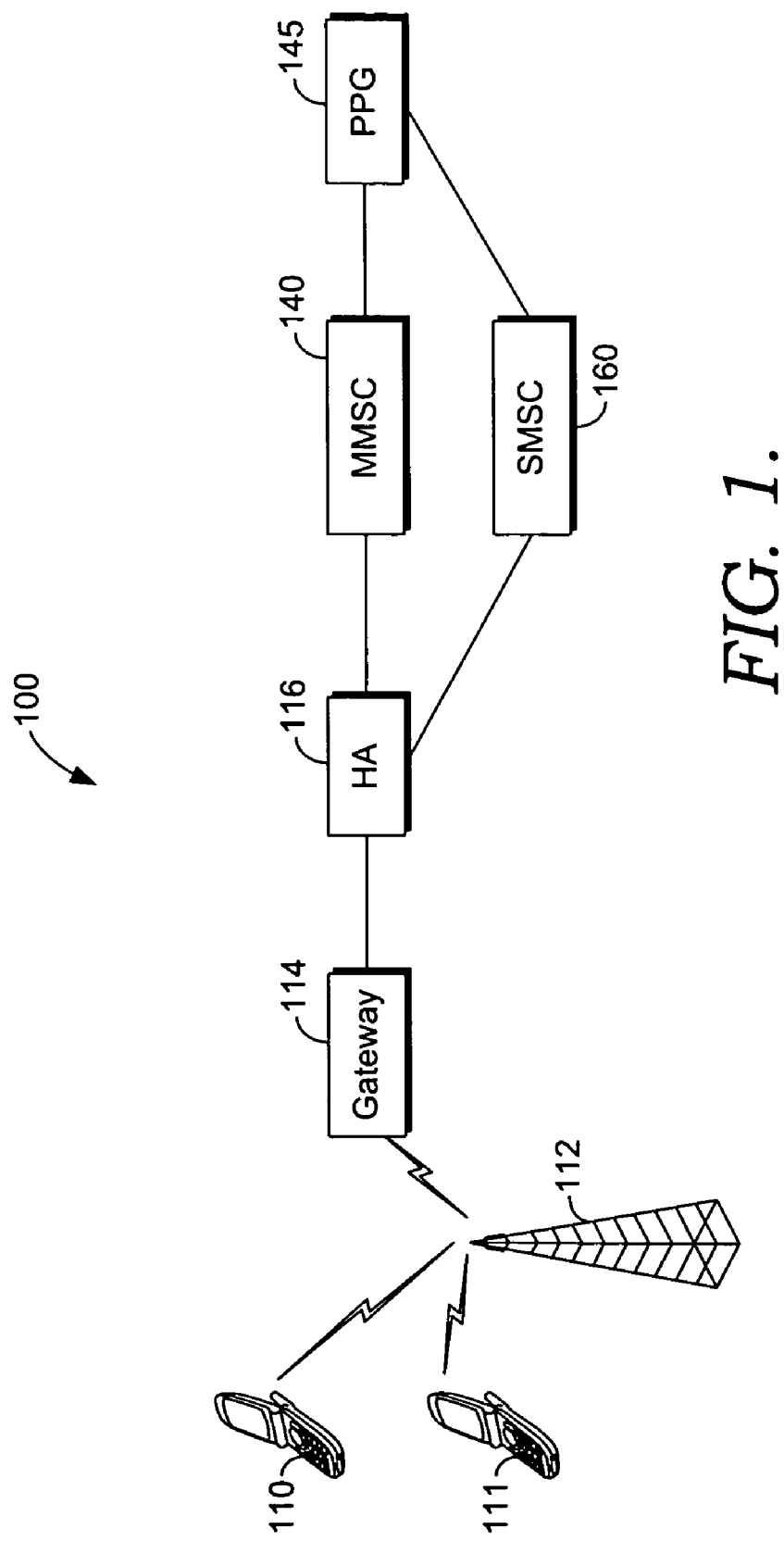
FIG. 1 is a drawing of an illustrative environment in which an embodiment of the present invention may operate.

The present invention is defined by the claims below. Embodiments of the present invention allow a user to specify the time at which a recipient is able to view a message (e.g., SMS message, MMS message). In one embodiment, the message is a multimedia message that may contain text along with one or more multimedia objects such as digital pictures or videos. The message may be sent to a recipient device such as mobile phone, smart phone or PDA. In one embodiment, the recipient device may download the message before a desired time of delivery and hold it in a hidden folder until moving it into the recipient's inbox at the desired time of delivery. Allowing the user to specify a desired time of delivery lets the user send a message at a time that is convenient for the user, while ensuring the recipient receives the message at the specific time, which may not be convenient for the user. For example, the user could send a message with birthday greetings the day before a recipient's birthday and specify that the recipient does not receive the message until a designated time on the recipient's birthday.

A user interface may be provided that allows a user to specify a desired time of delivery. In one embodiment, a desired time of delivery field is added to a message composition interface. In one embodiment, the desired time of delivery is conveyed within the message by adding the desired time of delivery to a designated header in message. Both the sending and receiving devices may be updated to recognize the desired time of delivery specified in the header. Upon receiving the message, the receiving device may store the message in a hidden folder and move it into the recipient's inbox at the specified delivery time. A message waiting notification may be provided to the recipient once the message is in the recipient's inbox. In one embodiment, messages with a specified delivery time are delivered to the recipient device when the network bandwidth usage is low.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. Further, various technical terms are used throughout this description. An illustrative resource that fleshes out various aspects of these terms can be found in *Newton's Telecom Dictionary* by H. Newton, 24nd Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.
An Illustrative Operating Environment Embodiments of the present invention may be practiced in a communications network providing service to devices communicatively coupled to the communications network. An illustrative operating environment 100 that contains a few of the components within such a communications network is shown in FIG. 1. The components shown in FIG. 1 are some of the components used as part of embodiments of the present invention. Many network components are not shown for the sake of simplicity. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Illustrative operating environment 100 includes mobile device 110, mobile device 111, base station 112, access gateway 114, Home Agent 116, Multimedia service center 140, Proxy Push Gateway ("PPG") 145, and Short-message service center 160. The present invention is not limited to embodiments that include a wireless device or a wireless network. However, the present invention may operate in a wireless network and with wireless devices. Accordingly, a wireless network has been included in illustrative operating environment 100 to illustrate one possibility.

Mobile devices 110 and 111 are depicted as wireless communications devices communicating over an air interface with base station 112. Mobile devices 110 and 111 are wireless terminals that are adapted to receive communications and media over the wireless networks included in illustrative operating environment 100. Some lower-level details of mobile devices 110 and 111 are not shown so as to not obscure embodiments of the present invention. For example, mobile devices 110 and 111 may include a bus that directly or indirectly couples the following devices: memory, one or more processors, one or more presentation components such as a display or speaker, input/output (I/O) ports, I/O components, and a power supply such as a battery. Mobile devices 110 and 111 may communicate via wireless protocols, such as code division multiple access ("CDMA"), global system for mobile communications ("GSM"), or time division multiple access ("TDMA"), as well as others, to communicate with base station 112.

Mobile devices 110 and 111 may take on any of a variety of forms. By way of example, mobile devices 110 and 111 may be a mobile telephone, smart phone, laptop computing device, desktop computing device, personal digital assistant ("PDA") or any combination of these or other devices. Mobile devices 110 and 111 are capable of receiving one or more forms of textual communications. Examples of communications that may be received include text messages, multimedia messages, emails, calendar updates, and task reminders.

Base station 112 is a fixed station used for communicating with mobile device 110 and mobile device 111. Standard air interface protocols, such as CDMA, GSM, TDMA, as well as others, may be used by base station 112 to communicate with mobile device 110 and mobile device 111. Other network communications interface arrangements are also possible. A base-station controller (not shown) is responsible for handling traffic and signaling with mobile device 110 and mobile device 111. Only one base station 112 is shown, and without its many components, for the sake of clarity. Mobile device 110 and mobile device 111 could be in simultaneous communication with multiple base stations.

Access gateway 114 provides a boundary between radio communication functions embodied in one or more radio access systems that form the access-facing portion of illustrative operating environment 100 and the standard internet protocol ("IP") communication functions (including Mobile IP) embodied in the public-network facing portion of illustrative operating environment 100. Access gateway 114 might be, for example, an ASN-GW, a PDSN, an SGSN/GGSN, and the like. In embodiments, access gateway 114 can be coupled with a foreign agent ("FA") (not shown). In one embodiment, access gateway 114 provides a home agent 116 ("HA") header data to packets such that packets received by access gateway 114 may be communicated to the HA 116.

Multimedia messaging service center ("MMSC") 140 is a network component that receives multimedia messages from a sender and stores the messages until they are downloaded by the recipient. Upon receiving a message, the MMSC 140 may send a notification message to the recipient device (hereafter "recipient") with instructions to download the message. In one embodiment, the notification message is a WAP push message. Upon receiving the notification message, the recipient establishes a connection with the MMSC 140 and downloads the message. The MMSC 140 may then delete the message. In one embodiment, the MMSC 140 is an intercarrier MMSC. An intercarrier MMSC facilitates transmission of messages between users of two different carriers (i.e., network providers).

Push Proxy Gateway ("PPG") 145 pushes a notification message to a recipient alerting the recipient that the message may be downloaded. The notification message may include a URL from which the message may be downloaded. The recipient responds to the message by setting up a connection to the MMSC 140 or other component storing the message.

Short Message Service Center ("SMSC") 160 is a network component that receives short message service ("SMS") messages from a sender and forwards the message to the recipient when the recipient is available. In one embodiment, the SMSC 160 stores the messages until the recipient is available.

Figure 2:
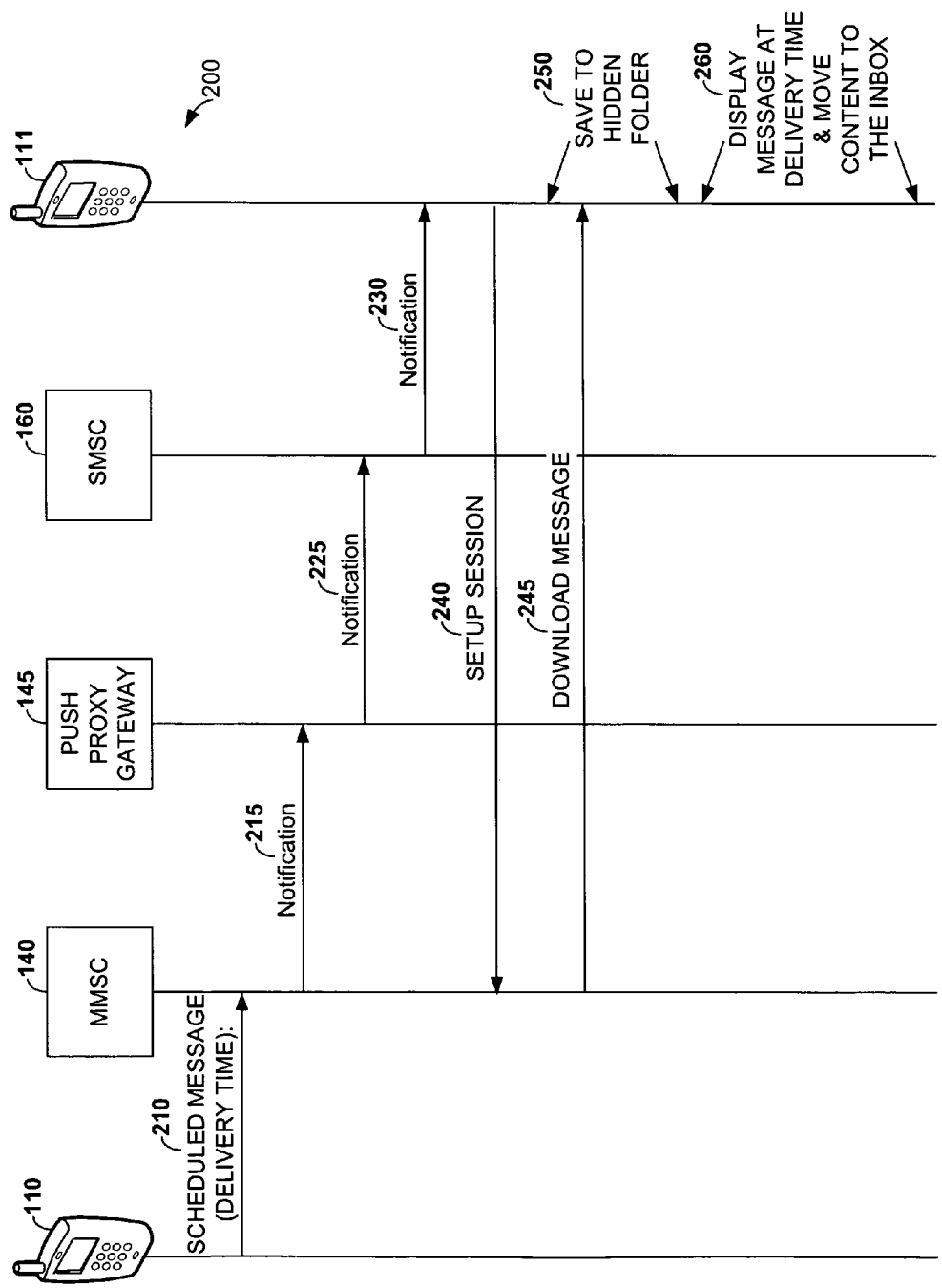
FIG. 2 is a drawing illustrating an exemplary computing system architecture 200 suitable for suggesting an action in response to receiving a textual communication.

FIG. 2 illustrates communications that occur between components to deliver a multimedia message to a communication device at a desired time of delivery according to an embodiment of the present invention. Communication device 110, MMSC 140, PPG 145, SMSC 160, and mobile communication device 111 have been described previously with reference to FIG. 1. While FIG. 2 describes communications occurring during the transmission of an MMS message, embodiments of the present invention are not limited to MMS messages.

An MMS message 210 is sent from communication device 110 to MMSC 140. The message 210 includes a desired time of delivery. The time of delivery may be described in a designated message header. The designated header may be registered with the governing bodies responsible for 3GPP, 3GPP2, or open mobile alliance protocols. In one embodiment, if a message having the designated header is sent without a desired time of delivery, the MMSC 140 treats the message as designated for immediate delivery.

Figure 3:
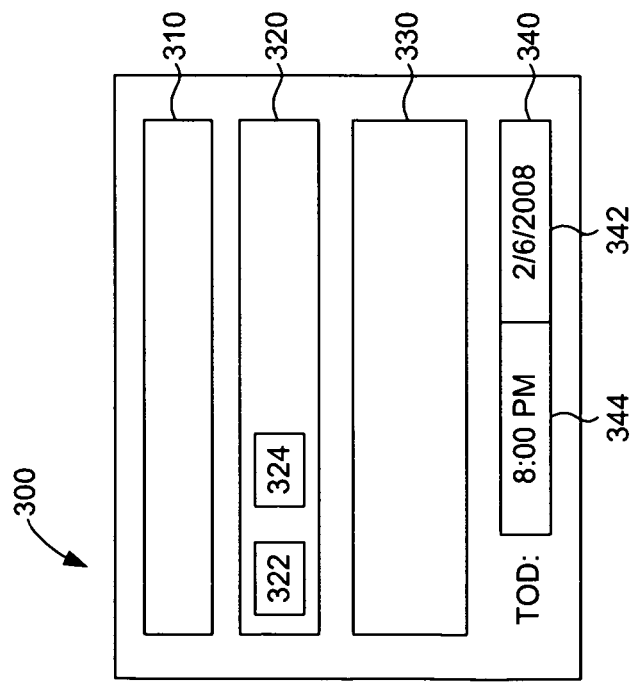
FIG. 3 is a drawing illustrating a graphical user interface composing an MMS message with input fields to specify a delivery time, in accordance with an embodiment of the present invention.

The time of delivery may be received from a user through a user interface presented on mobile communication device 110. An example of such a user interface is illustrated in FIG. 3. User interface 300 includes an address line 310 into which a destination address may be entered. User interface 300 also includes a multimedia section 320 showing the media attached to the message. In this case, the multimedia section 320 includes picture 322 and picture 324. User interface 300 also includes a content section 330 into which text may be entered by a user to be sent along with the multimedia. The desired time of delivery section 340 includes a date section 342 and a time section 344. The date section 342 is formatted to receive a date. In one embodiment, upon clicking the date section with a pointing device, a calendar is displayed and a date may be entered by choosing a day on the calendar. The time section 344 is formatted to receive a time of day. In one embodiment, times are suggested in 15-minute intervals upon selecting the time section 344. This is just one example of a suitable user interface and other user interfaces may be utilized to receive the desired time of delivery. In another embodiment, the date and time is entered into a pop-up window that is activated upon selecting a portion of a message composition interface.

Referring again to FIG. 2, upon receiving message 210 that includes a scheduled delivery time, MMSC 140 consults with a notification policy to determine when a message-waiting notification 215 should be sent to the push proxy gateway 145. The purpose of the notification policy is to balance bandwidth load on a network utilized by the MMSC 140. It is desirable to send a message-waiting notification 215 at a time when network bandwidth usage is low as the recipient may download the message shortly after receiving the message-waiting notification 215. The MMSC 140 waits until the notification policy is satisfied and then sends a message-waiting notification 215 to the push proxy gateway 145.

In one embodiment, the notification policy causes the message-waiting notification 215 to be sent immediately when the desired time of delivery is prior to the next anticipated low bandwidth usage period. In another embodiment, the message-waiting notification 215 is sent immediately when the desired time of delivery is less than a threshold amount of time from when the message is received by the MMSC 140. For example, if the desired time of delivery is 15 minutes from when the message is received, the message will be processed for immediate delivery and a message-waiting notification 215 will be sent to the push proxy gateway 145 immediately. In another embodiment, it is determined that the desired time of delivery is after the conclusion of the next anticipated low network usage time period. Upon making this determination, the message-waiting notification 215 is scheduled for delivery during the next low bandwidth period. The next low bandwidth period may be determined based on historical usage data in the network. For example, historical network usage may be low during the late evening and early morning periods. In another embodiment, the present bandwidth usage is retrieved and the message-waiting notification 215 is sent immediately if the bandwidth usage is less than a threshold amount. The threshold amount may be a percentage of the nominal bandwidth capacity. If the bandwidth usage is greater than the threshold amount, the message-waiting notification 215 is delayed until the network bandwidth usage is below a threshold amount or the desired delivery time is within the threshold amount of the present time. In other words, the MMSC 140 waits until the last minute to send a message-waiting notification if the network bandwidth usage remains high between the time the message 210 is received and the desired time of delivery.

Upon receiving the message-waiting notification 215, the push proxy gateway 145 generates a notification message 225 that is sent to SMSC 160. Message 225 will typically include a URL, or other information, that instructs a recipient device how to retrieve the message 210 from MMSC 140. The SMSC 160 will then take this information and generate a notification message 230 that is sent to the recipient's mobile device 111. Mobile device 111 will then set up a download session 240 with the MMSC and download 245 the message 210 to the mobile device 111.

Upon downloading the message 210, which will contain the multimedia as well as a desired time of delivery, the message will be saved to a hidden folder. A hidden folder is a folder on the recipient device that is not visible to a user of the device. Similarly, the contents of a hidden folder are not visible to the user. The mobile device 111 then determines that the message specifies a desired time of delivery and keeps the message in the hidden folder. The user of mobile device 111 is not alerted to the presence of message 210 within the hidden folder. In one embodiment, all downloaded messages are initially placed in the hidden folder until the desired time of delivery is ascertained. If the downloaded message does not specify a desired time of delivery, the message may immediately be moved into an inbox. In another embodiment, the desired time of delivery is determined upon receiving the message prior to placing the message in the inbox or a hidden folder. The message is placed in the inbox if a desired time of delivery is not specified or if the desired time of delivery makes placement in the inbox appropriate. If a desired time of delivery is specified and is not equal to the present time, the message is placed in a hidden folder. Other methods of holding a received message with a future desired time of delivery without notifying the recipient are also possible.

The mobile device 111 will move the message 210 into an inbox when the time on the mobile device 111 equals the desired time of delivery 260. The message 210 is then available to the user and the user may be alerted that the message is waiting in their message inbox. FIG. 2 is just one illustration of communications that can occur between components during delivery of a message with a desired time of delivery. FIG. 2 illustrates the transmission of a multimedia message, but a similar process could be used to deliver an SMS message, or other message type, at a desired time. In an embodiment delivering SMS messages, MMSC 140 would be replaced by an SMSC.

Figure 4:
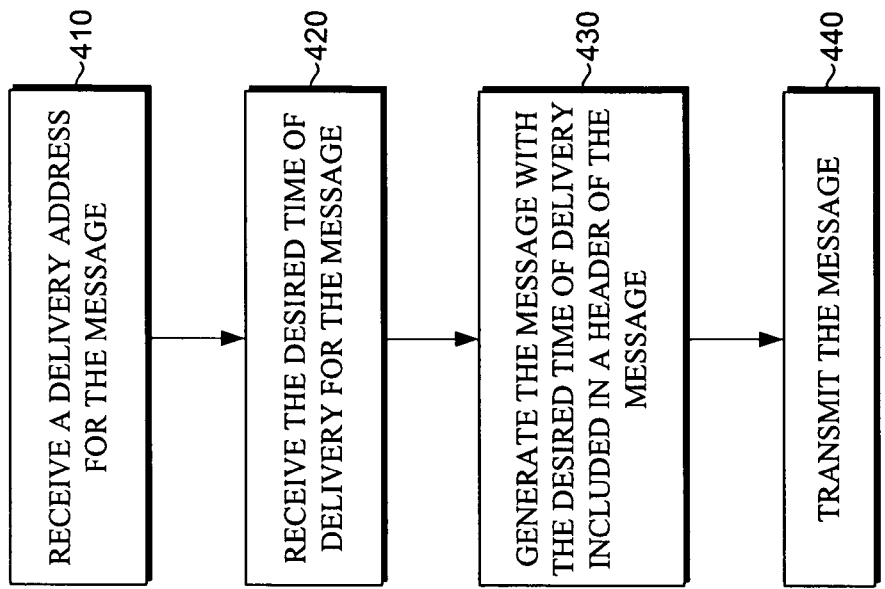
FIG. 4 is a flow diagram illustrating a method of specifying a desired time of delivery for a message, in accordance with an embodiment of the present invention.

Turning now to FIG. 4, a method of specifying a desired time of delivery for a message is illustrated according to an embodiment of the present invention. At step 410, a delivery address for a message is received. As described previously, the delivery address may be received through a user interface provided by a mobile device or other communication device capable of sending messages. At step 420, the desired time of delivery for the message is received. The desired time of delivery for the message may likewise be received through one or more user interfaces.

At step 430, the message, which includes the desired time of delivery, is generated. The desired time of delivery may be included in a header of the message understood by the recipient to communicate the desired time of delivery. The message may be an SMS message, an MMS message or another suitable message format. At step 440, the message, which includes the desired time of delivery, is transmitted. As described previously, the message may be transmitted to a messaging center such as MMSC 140.

Figures 5, 6:
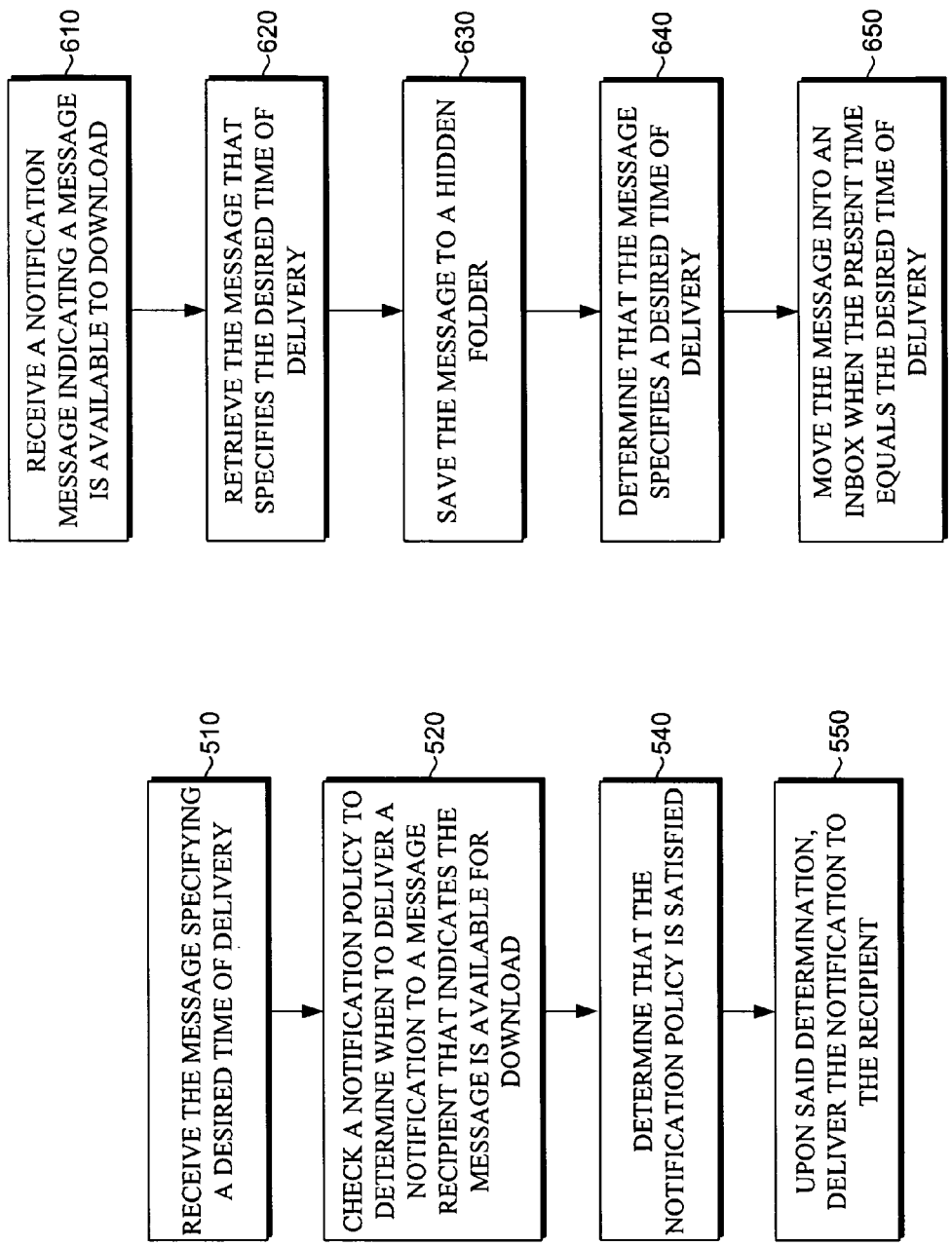
FIG. 5 is a flow diagram illustrating a method of prioritizing transmission of a notification indicating a message is available for download, in accordance with an embodiment of the present invention.
FIG. 6 is a flow diagram illustrating a method of presenting a message that specifies a desired time of delivery in accordance with an embodiment of the present invention.

Turning now to FIG. 5, a method of prioritizing transmission of a notification indicating a message is available for download is shown in accordance with an embodiment of the present invention. At step 510, a message specifying a desired time of delivery is received. The message may be an MMS, SMS, or other message format. At step 520, a message notification policy is consulted to determine when to deliver a notification to a message recipient that indicates the message is available for download. In one embodiment, the goal of the notification policy is to deliver the notification at a time of lower network bandwidth usage if allowed by the desired time of delivery. In an embodiment, the first priority is to meet the described time of delivery, and the second priority is to send a notification during a low network usage period. The message may be downloaded by the recipient immediately after receiving the notification. Different notification policy details have been described previously with reference to FIG. 2. At step 530, it is determined that the notification policy is satisfied. Upon determining that the notification policy is satisfied, at step 540 the notification is delivered to the recipient.

Turning now to FIG. 6, a flow chart illustrating a method of presenting a message that specifies a desired time of delivery is shown, in accordance with an embodiment of the present invention. At step 610, a notification message indicating a message is available to download is received. As described previously, the notification message may be sent from an SMSC or other similar component. At step 620, the message indicated in the notification is retrieved. The message may be retrieved by setting up a communications session and downloading the message from a component storing the message, such as an MMSC. In one embodiment, the notification message includes a URL or other information with instructions on how to download the message.

At step 630, the message is saved to a hidden folder. The hidden folder may be formatted so that a user of the device is not aware of messages in the hidden folder. Further, a message-waiting notification should not be sent for messages that are in the hidden folder. At step 640, it is determined that the message specifies a desired time of delivery. The desired time of delivery is a time at which the message is to be made available to the recipient. Typically, the recipient is the owner or operator of the destination device. At step 650, the message is moved into an inbox when the present time equals the desired time of delivery. Once in the inbox, the message is available to the user. In addition, a message-arrival notification may be sent to the user once the message is moved into the inbox from the hidden folder. As described previously, the message may be a multimedia message, a short message service message, or some other message format.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer readable media having computer-executable instructions embodied thereon that, when executed by a computing device, performs a method of prioritizing transmission to a recipient device of a notification indicating a message is available for download, the method including:
   receiving the message, wherein the message specifies within a message header a desired time of delivery;
   checking a notification policy to determine when to deliver the notification to the recipient device, wherein the notification indicates the message is available for download, wherein the notification policy instructs delivery of the notification during a next low network usage time period upon determining that the desired time of delivery is after the next low network usage time period, and wherein the next low network usage time period is determined based on historical usage data and is defined in the notification policy as a time period;
   determining that the notification will be sent during a low network usage time period that occurs between when the message was received and the desired time of delivery;
   upon said determining that the notification will be sent during the low network usage time period, transmitting the notification to the recipient device during the low network usage time period;
   receiving, from the recipient device, a request to communicate the message to the recipient device; and
   communicating the message to the recipient device with the desired time of delivery specified within the message header.

2. The media of claim 1, wherein the notification policy includes:
   delivering the notification if current network usage is below a threshold amount.

3. The media of claim 1, wherein the notification policy includes:
   delivering the notification without delay when the desired time of delivery is less than a threshold amount from a present time.

4. The media of claim 1, wherein the message is one of a multimedia message service message and a short message service message.

5. The media of claim 4, wherein the desired time of delivery includes one or more of a time of day and a date.

6. One or more non-transitory computer-readable media having computer-executable instructions embodied thereon that, when executed by a computing device, performs a method of prioritizing transmission to a recipient device of a notification indicating a message is available for download, the method including:
   receiving the message, wherein the message specifies within a message header a desired time of delivery;
   checking a notification policy to determine when to deliver the notification to the recipient device, wherein the notification indicates the message is available for download, wherein the notification policy instructs delivery of the notification during a next low network usage time period upon determining that the desired time of delivery is after the next low network usage time period, and wherein the next low network usage time period is determined based on historical usage data and is defined in the notification policy as a time period; and communicating the message to the recipient device with the desired time of delivery specified within the message header, wherein the recipient device does not notify a user that the message has been received until the desired time of delivery.

7. The media of claim 6, wherein the notification policy includes:

delivering the notification if current network usage is below a threshold amount.

8. The media of claim 6, wherein the notification policy includes:

delivering the notification without delay when the desired time of delivery is less than a threshold amount from a present time.

9. The media of claim 6, wherein the message is one of a multimedia message service message, and a short message service message.

10. The media of claim 9, wherein the desired time of delivery includes one or more of a time of day and a date.

11. One or more non-transitory computer-readable media having computer-executable instructions embodied thereon that, when executed by a computing device, performs a method of prioritizing transmission to a recipient device of a notification indicating a message is available for download, the method including:

receiving the message, wherein the message specifies within a message header a desired time of delivery;

checking a notification policy to determine when to deliver the notification to the recipient device, wherein the notification indicates the message is available for download, wherein the notification policy instructs delivery of the notification during a next low network usage time period upon determining that the desired time of delivery is after the next low network usage time period, and wherein the next low network usage time period is determined based on historical usage data and is defined in the notification policy as a time period;

determining that the desired time of delivery is after the next low network usage time period;

determining that the notification will be sent during the next low network usage time period that occurs between when the message was received and the desired time of delivery;

delivering, during the next low network usage time period, the notification that indicates the message is available for download;

receiving, from the recipient device, a request to communicate the message to the recipient device; and communicating the message to the recipient device with the desired time of delivery specified within the message header.

12. The media of claim 11, wherein the method further comprises delivering a notification that indicates the message is available for download when current network usage is below a threshold amount.

13. The media of claim 11, wherein the method further comprises delivering a notification that indicates the message is available for download without delay when the desired time of delivery is less than a threshold amount from a present time.

14. The media of claim 11, wherein the message is one of a multimedia message service message, and a short message service message.

* * * * *